United States Patent
Srinivasan et al.

(10) Patent No.: US 7,536,526 B2
(45) Date of Patent: May 19, 2009

(54) HIERARCHICAL STATE BASED MIGRATION OF STRUCTURED DATA

(75) Inventors: Arvy Srinivasan, Wheeling, IL (US); Yun Wu, Schaumburg, IL (US)

(73) Assignee: General Electric Company, Schenectady, NY (US)

( * ) Notice: Subject to any disclaimer, the term of this patent is extended or adjusted under 35 U.S.C. 154(b) by 246 days.

(21) Appl. No.: 11/178,757

(22) Filed: Jul. 11, 2005

(65) Prior Publication Data

US 2007/0011422 A1    Jan. 11, 2007

(51) Int. Cl.
*G06F 12/02* (2006.01)

(52) U.S. Cl. .................. 711/165; 711/161; 711/162; 711/170; 714/6

(58) Field of Classification Search ............. 711/161, 711/162, 165, 170; 714/5, 6
See application file for complete search history.

(56) References Cited

U.S. PATENT DOCUMENTS 5,857,457 A * 1/1999 Hyppola .............. 128/203.15
2004/0080558 A1 * 4/2004 Blumenau et al. ............ 347/19
2005/0283564 A1 * 12/2005 LeCrone et al. ............. 711/100

\* cited by examiner

*Primary Examiner*—Jasmine Song
(74) *Attorney, Agent, or Firm*—McAndrews, Held & Malloy, Ltd.; Peter J. Vogel; Michael A. Dellapenna

(57) ABSTRACT

The present invention provides a method for hierarchical state based migration of data. The method includes determining one or more constraints and/or global parameters for migration of data from a first storage location to a second storage location, allocating copy and updating resources to copy data from the first storage location to the second storage location based on at least one constraints and/or global parameter, altering at least one of the constraints based on one or more states of the data in the migration, and reallocating at least one of the copy and/or updating resources during the migration based on the altering step. The present invention also provides for the hierarchical migration of data by assigning tasks and/or responsibilities for the migration to various components of a hierarchical system.

21 Claims, 4 Drawing Sheets

HIERARCHICAL STATE BASED MIGRATION OF STRUCTURED DATA

BACKGROUND OF THE INVENTION

The present invention generally relates to the migration of data from one storage location to another. More specifically, the present invention relates to the hierarchical state based migration of structured data.

Picture archiving and communication systems ("PACS") connect to medical diagnostic imaging devices and employ an acquisition gateway (between the acquisition device and the PACS), storage and archiving units, display workstations, databases, and sophisticated data processors. These components are integrated together by a communication network and data management system. A PACS has, in general, the overall goals of streamlining health-care operations, facilitating distributed remote examination and diagnosis, and improving patient care.

A typical application of a PACS system is to provide one or more medical images for examination by a medical professional. For example, a PACS system can provide a series of x-ray images to a display workstation where the images are displayed for a radiologist to perform a diagnostic examination. Based on the presentation of these images, the radiologist can provide a diagnosis. For example, the radiologist can diagnose a tumor or lesion in x-ray images of a patient's lungs.

A series or sequence of a plurality of medical images is an imaging study. In order to properly diagnose a current imaging study, a radiologist must examine one or more previously acquired images of the same patient and compare these images to images of a current study.

For a particular hospital or clinic, the amount of computer readable storage used to store the imaging studies for patients of the hospital or clinic can be substantial. In addition, from time to time, a hospital or clinic may desire to update or alter its storage medium used to store one or more of the imaging studies of its patients. For example, medical imaging applications are currently heavily dependent upon the underlying storage technology used to store the medical imaging studies. The average life cycle of a particular storage technology is approximately five years. Therefore, a hospital or clinic may have to update its storage solution frequently, thus requiring the migration of a considerable amount of data (i.e., terabytes of data) to avoid storage obsolescence. For example, in the past a hospital may have used a tape storage solution for storing the imaging studies of its patients. However, the hospital may desire to switch to a computer disk storage solution, for example.

Moving, or migrating, the imaging studies from the old storage solution to the new storage solution can involve a considerable amount of time. When such a migration of imaging study data occurs, traditional systems and methods for migrating data prevent access to the imaging studies being migrated until the migration is complete. For example, a physician or radiologist cannot access imaging studies being migrated by traditional systems and methods during the data migration. Specifically, imaging studies may be accessed by a physician or radiologist using a workstation in a PACS system. The physician or radiologist may access a database of meta data links (or hyperlinks) that associate one or more imaging studies with a patient. By clicking on the link, the imaging study(ies) for a particular patient may be accessed and presented on the workstation. However, during data migration using traditional systems and methods, the link to the imaging study(ies) is not accurate during the migration. That is, a physician or radiologist may not access one or more imaging studies using the link in the database if the link does not direct the workstation to the current location of the data during the migration.

In addition, during the migration of data using traditional systems and methods, the migration occurs in a bulk manner. In other words, the migration traditionally occurs by moving entire imaging studies and/or multiple imaging studies at once. The process of copying the data to the new storage location cannot be stopped and started during the data migration. In this way, imaging study data has only two states in the traditional data migration—pre- and post-migration. Traditional systems and methods do not provide for additional states of data migration (so that the data migration can be stopped and re-started at various states).

Moreover, traditional systems and methods are static in their allocation of migration resources. That is, traditional systems and methods allocate resources (such as computer copying scripts) to migrate data from a legacy storage medium to a new storage solution before the migration occurs. However, these systems and methods do not allow for any updating of this allocation of resources during the data migration. For example, current migration systems and methods do not allow for the re-allocation of migration resources during the migration in order to provide for a more efficient data migration.

Therefore, a need exists for an improved method of migrating data from a legacy storage solution to a new storage solution. Such an improved data migration offers the ability to interrupt the migration at any point, to restart the migration at a point of interruption, to access the data at any time during the data migration, and/or to reallocate migration resources during the data migration.

BRIEF SUMMARY OF THE INVENTION

The present invention provides a computer-readable storage medium including a set of instructions for a computer. The instructions include a knowledge base routine, one or more copy routines, one or more update routines, and a managing routine. The knowledge base routine is configured to store one or more constraints for a data migration of data from a first storage location to a second storage location. The copy routines are configured to copy the data from the first storage location to the second storage location. The update routines are configured to update a storage location associated with the data in a database with the second storage location. The managing routine is configured to allocate a number of the copy routines and/or a number of the update routines to participate in the data migration. The managing routine is also configured to reallocate at least one of the number of copy routines and/or the number of update routines based on one or more states of the data in the data migration and/or one or more of the constraints.

The present invention also provides a method for hierarchical state based migration of data. The method includes determining one or more constraints and/or global parameters for a migration of data from a first storage location to a second storage location, allocating a number of copy resources to copy the data from the first storage location to the second storage location based on at least one of the constraints and/or global parameters, allocating a number of updating resources to update a location associated with the data in a database with the second location based on at least one of the constraints and/or global parameters, altering at least one of said constraints based on one or more states of the data in the data migration, and reallocating at least one of the number of copy resources and the number of updating resources during the migration of data based on the altering step.

The present invention also provides a method for migrating data. The method includes allocating one or more migration resources based on one or more global parameters and/or constraints of a data migration, determining one or more states of the data migration, and based on the one or more states of the data migration and/or one or more of the constraints, reallocating at least one of the migration resources.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

Figure 1:
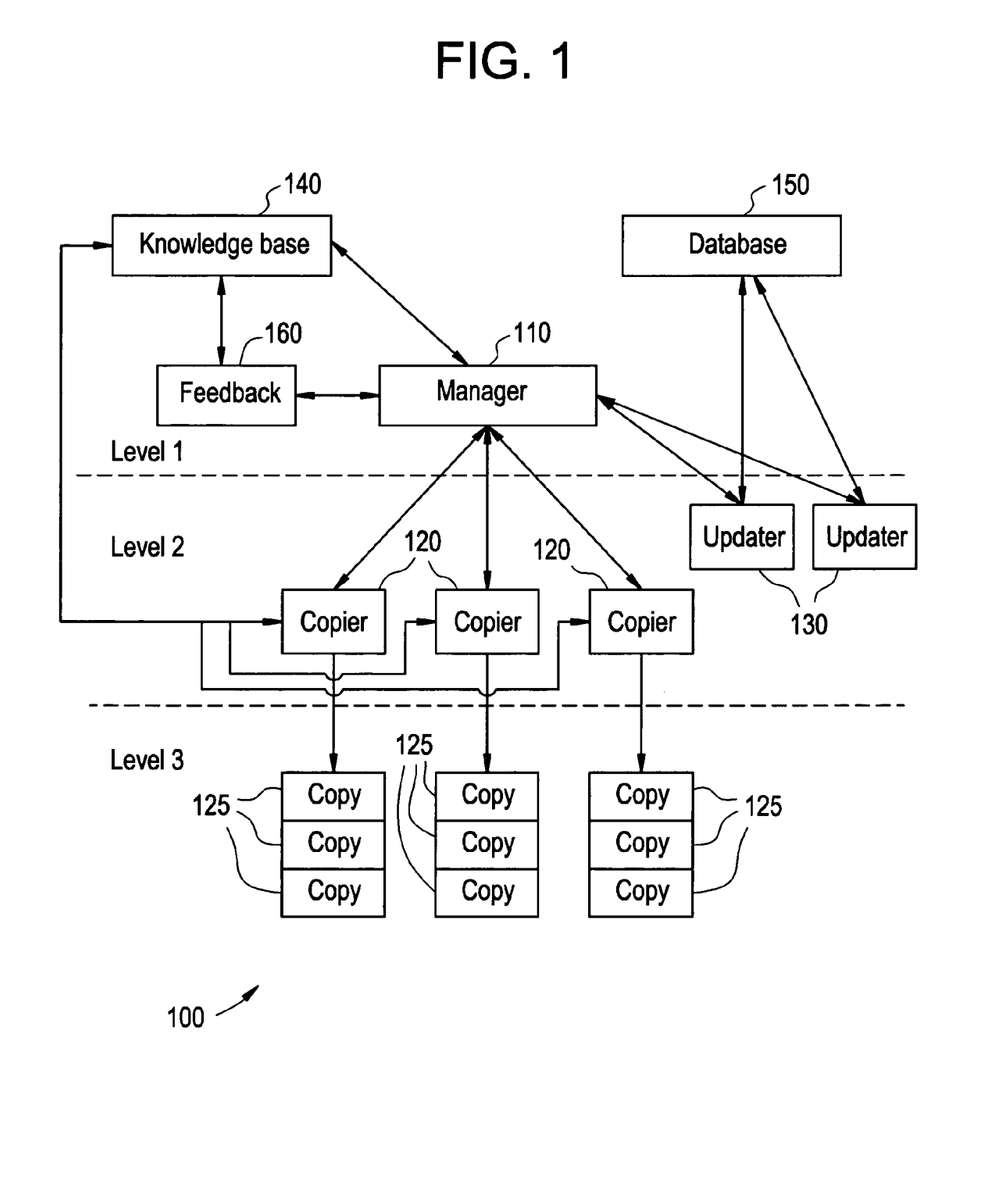
FIG. 1 illustrates a data migration system for hierarchical state based migration of structured data according to an embodiment of the invention.

FIG. 1 illustrates a data migration system 100 for hierarchical state based migration of structured data according to an embodiment of the invention. System 100 includes a manager 110, a copier 120, a copy script 125, an updater 130, a knowledge base 140, a database 150, and a feedback routine 160. In general, unless otherwise noted, throughout this application, reference to "a X" or "an X" shall be understood to mean "one or more X's." For example, system 100 can include one or more of manager 110, copier 120, copy script 125, updater 130, knowledge base 140, database 150, and feedback routine 160. In addition, unless otherwise noted, throughout the figures of this application, reference to a single item in a figure shall be understood to indicate reference to one or more of the items. For example, while FIG. 1 only illustrates a single manager 110 in system 100, system 100 may also include a plurality of managers 110.

In an embodiment, any one or more of manager 110, copier 120, copy script 125, updater 130, knowledge base 140, database 150, and feedback routine 160 may be embodied in a set of instructions stored on one or more computer-readable media. For example, any one or more of manager 110, copier 120, copy script 125, updater 130, knowledge base 140, database 150, and feedback 160 may be a software application.

In another embodiment, any one or more of manager 110, copier 120, copy script 125, updater 130, knowledge base 140, database 150, and feedback 160 may be embodied in a software application that is spawned or created by another software application. For example, manager 110 may spawn or create one or more software applications that perform the tasks (described below) of any one or more of copier 120 and/or updater 130.

In another embodiment, any one or more of manager 110, copier 120, copy script 125, updater 130, knowledge base 140, database 150, and feedback 160 may be embodied in a computer device. For example, any one or more of manager 110, copier 120, copy script 125, updater 130, knowledge base 140, database 150, and feedback 160 may be embodied in a server that includes a processor and/or a computer readable storage medium such as computer storage.

In an embodiment of the present invention, any one or more instances of communication between two or more components of system 100 may occur electronically. For example, an instance of communication may include the communication of data or a signal over a wired or wireless communication path. A communication path can include any path capable of carrying an electric data or signal, such as a wired or wireless network connection.

In operation, system 100 performs a migration of data from one storage location to another storage location. For example, system 100 may be employed to move medical imaging studies stored on a legacy storage system (such as a tape-based storage system, for example) to a new storage system (such as a new all disk storage system, for example). In another example, system 100 can be used to move electronic mail ("email") from one storage location to another. For example, system 100 may be employed to automatically migrate email data older than a certain date to another storage location. While these two examples are provided, system 100 is not limited to the migration of data in medical imaging studies or emails. System 100 may be used to migrate any structured data.

The starting storage location and ending storage location may be remote from one another. For example, the starting storage location may be located on a computer readable storage medium such as a computer readable storage that is separated from another computer readable storage medium where the ending storage location resides. However, the term "remote" does not require that any considerable distance separate the two storage locations. For example, the two storage locations may be located on separate computer-readable storage media that are included in a singular computing device, a single room, or a single building. However, a considerable distance may separate the two storage locations. For example, the two storage locations may be located on separate computer-readable storage media that are not included in a singular computer device, single room, or single building.

In another embodiment, both the starting and ending storage locations may be located on the same computer readable storage medium. For example, both the starting and ending storage locations may be located within the same Redundant Array of Inexpensive/Independent Disks ("RAID").

The migration of data from the starting, or first, storage location to the ending, or second, storage location may be confined by one or more constraints. A constraint includes any limitation or parameter on the migration of data. For example, a constraint may include an identification of what data is to be migrated (for example, which medical imaging studies or emails are to be migrated), a number of data sets that is to be migrated (for example, a number of medical imaging studies or emails to be migrated), a total amount of data that is to be migrated, an amount of storage that is available at the second storage location, and/or one or more time limits. A time limit may be any limitation on when or how quickly data migration is to occur. For example, a time limit may be a point in time before which data must be migrated (for example, a point in time when the first storage location will become unavailable for data migration or when the second storage location will become too full for the data migration). A time limit may also be a starting time for data migration, for example. For example, the second storage location may not be available for data migration until a certain time in the future.

System 100 performs the migration of data according to a hierarchical structure, similar to a corporate structure. In general, system 100 may migrate data according to a state based migration and a hierarchical multi-threading process. For example, as described in more detail below, manager 110 allocates resources (such as copiers 120 and updaters 130) to migrate the data and to update database 150 once the migration is complete. Manager 110 thus acts as an executive or Level 1 officer in the corporate environment that establishes the goals (such as the data migration) and controls the overall direction of the company (such as system 100), for example. Copiers 120 and updaters 130 act as mid-level managers, or Level 2 officers, who are tasked out with the actual day-to-day monitoring of work and tasks (such as actually migrating the data and updating database 150) and ensuring that the work and tasks are performed, for example. Copy scripts 125 act as workers or engineers, or Level 3 employees, who do the actual task of physically performing the work and tasks (such as physically moving the data in the migration), for example.

Manager 110 initially consults knowledge base 140 to acquire one or more constraints on a data migration. For example, manager 110 may send a request to knowledge base 140 for one or more constraints. In general, knowledge base 140 stores information and status of data migration required to complete the data migration. In one embodiment, knowledge base 140 relieves all other components of system 100 from retaining any specific state information or status of data migration, or log(s) of data migration. By storing this information in knowledge base 140, system 100 has increased flexibility of stopping and starting a data migration at any point in time.

In an embodiment, knowledge base 140 includes three components: a migration control entity, a configuration entity and meta data entity. One or more of the migration control, configuration and meta data entities may be embodied in a set of instructions stored on one or more computer-readable media. For example, the migration control, configuration and meta data entities may be software applications.

In another embodiment, any one or more of the migration control, configuration and meta data entities may be embodied in hardware such as a computer device. For example, any one or more of migration control, configuration and meta data entities may be embodied in a computer that includes a processor and/or a memory. The migration control, configuration and/or meta data entities are not restricted to software applications alone and may be implemented in hardware devices as well. Hardware device(s) may therefore perform any one or more tasks of the migration control, configuration and/or meta data entities in the data migration of the present invention. For example, an Application Specific Integrated Circuit ("ASIC") may be employed to perform any one or more tasks of the migration control, configuration and/or meta data entities.

Knowledge base 140 may be employed to store information on the overall migration process. For example, knowledge base 140 may store the number of copier and/or update routines, one or more time constraints on a data migration (e.g., what time to begin and/or end the migration), information on the data or data sets that are to be migrated, and/or information on file sets that are to be migrated. A file set is a set of data (such as image files) having a unique identifier. For example a CT scan of a patient may produce 200 image files that may be categorized into a single file set.

In another embodiment, knowledge base 140 may store information on a set of data or a file set instead of information on the data that is included in the set of data or file set. For example, knowledge base 140 may only store information on an entire imaging study as opposed to information on each image file in the imaging study.

Figure 3:
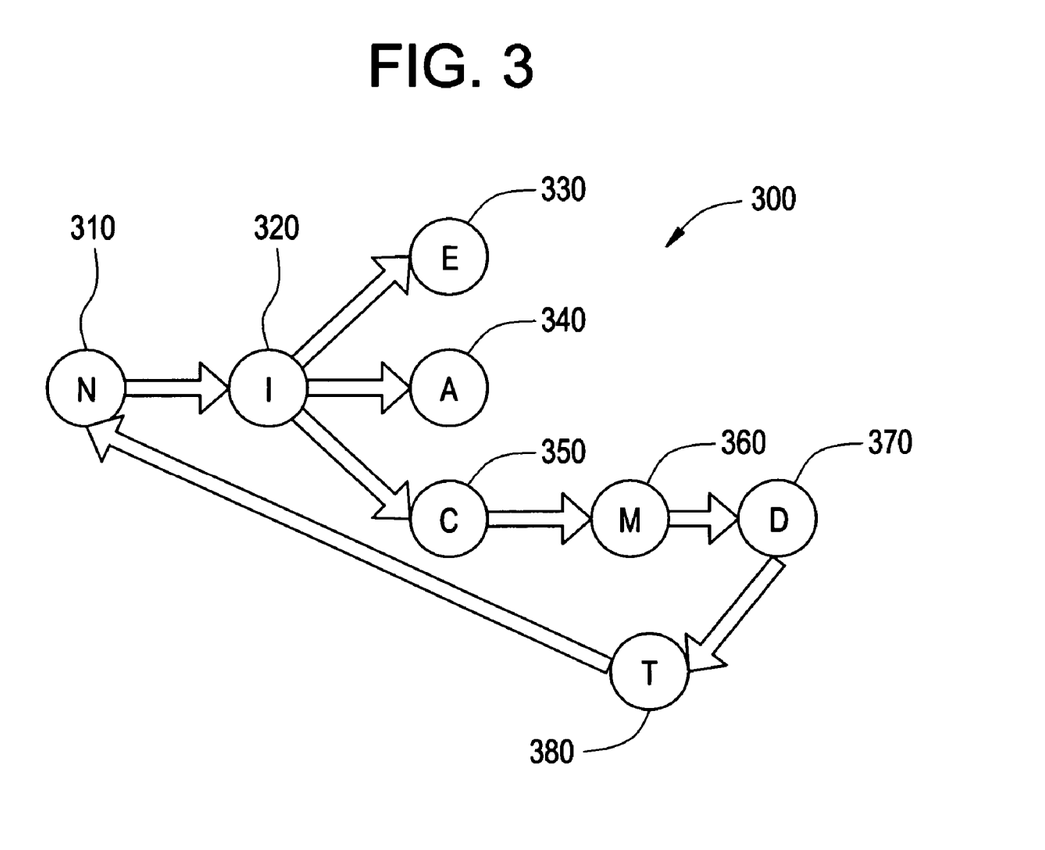
FIG. 3 illustrates a state flow for the migration of data in accordance with an embodiment of the present invention.

The migration control entity maintains a state flow for each data set as it is migrated from its starting storage location to its ending storage location. FIG. 3 illustrates a state flow 300 for the migration of data in accordance with an embodiment of the present invention. State flow 300 includes several states that describe one or more states that data may exist in during the migration from the first storage location to the second storage location. For example, state flow 300 may include states such as a study-not-migrated or non-migrated state 310, a migration-in-progress state 320, a migration-error state 330, a migration-not-required state 340, a data-transferred-to-destination state 350, a meta-data-update-in-progress state 360, a migration-complete state 370, and a rollback or repeat-migration state 380. State flow 300 may include a fewer or greater number of states than the states listed above, as would be recognized by one of ordinary skill in the art.

Data may be in the study-not-migrated or non-migrated state 310 before beginning any data migration. For example, the data may be in the study-not-migrated or non-migrated state 310 when the data is still located at the starting storage location and/or before the data has been copied to the ending storage location.

Data may be in the migration-in-progress state 320 when system 100 is in the process of migrating the data from the starting to the ending storage location. For example, data may be in the migration-in-progress state 320 when data at the starting storage location is being copied to the ending storage location and has not been completely copied to the ending storage location and/or deleted at the starting storage location.

Data may be in the migration-error state 330 when one or more errors have occurred in the data migration. For example, an error may occur when the original data stored at the starting storage location or a copy of the data stored at the ending storage location becomes corrupted, missing, incomplete, or has any other error known to those of ordinary skill in the art occur.

Data may be in the migration-not-required state 340 when the data does not need to be migrated. For example, it may be determined that data at a starting storage location does not need to be copied and moved to the ending storage location. Such a determination may occur for any reason.

Data may be in the data-transferred-to-destination state 350 when data has been copied, moved, and/or migrated from the starting storage location to the ending storage location. For example, in one embodiment of the present invention, data may be in the data-transferred-to-destination state 350 once a complete copy of data has been made at the ending storage location.

Data may be in the meta-data-update-in-progress state 360 when a link or meta data link to the data in database 150 is being updated. For example, system 100 can include a database 150 such as an application data object. An application data object may include a database that holds meta data information of data stored in the database. For example, information such as the location of the data, size of the data, and the date on which it was written etc. Database 150 may include one or more links or meta data links that allow a user of system 100 to easily access data. For example, database 150 may include a listing of all data or sets of data and a storage location where the data is stored. Database 150 may also include a link or meta data link that associates each data or set of data with a storage location, such as the starting or ending storage location. Database 150 and the links may then be used by a user to quickly access or more data sets.

For example, in a PACS system a user may click or activate a link (such as a meta data link) on a screen at a user workstation. The link may be associated with associated with one or more medical imaging studies. By activating the link, the PACS system causes the one or more medical imaging studies associated with the link to be presented to the user at the workstation.

In system 100, data is in meta-data-update-in-progress state 360 once the data is accessible from the ending or second storage location. For example, a link in database 150 to a given data set may point, direct, or link a user, software application, or other process to the data at the starting or first storage location before the data has been migrated to the ending or second storage location. While the data is being copied to the second or ending storage location, the data may still be available at the starting storage location. In such a situation, a link in database 150 to the data points, directs, or links a user, software application, or other process to the data at the starting or first storage location. Once the data has been copied, moved or otherwise migrated to the second or ending storage location, the link associated with the data in database 150 may be updated to reflect the existence of the data at the second or ending storage location. At this point, for example state 360, the link is updated and points, directs, or links a user, software application, or other process to the data at the ending or second storage location. In this embodiment, associating the a storage location with data by a link in database 150 permits data to be migrated while allowing the data to be accessed via the database 150 link. As the database 150 link points to the data at the starting storage location before and during migration, a user, software application, or other process can still access the data while migration is progressing, for example. Once migration is complete, the database 150 link is updated to reflect the new location of the data.

Data may be in the migration-complete state 370 once a copy of the data has been made at the ending storage location and the copy of the data at the starting storage location has been deleted or otherwise removed from the starting storage location, for example. At this point, the migration of data is complete.

Data may be in a rollback or repeat-migration state 380 if a migration of the data needs to be repeated. For example, an error may occur in the migration of data or it may be desired to repeat the migration of data. In such a scenario, data is in state 380 if the migration needs to be repeated.

The configuration entity of knowledge base 140 stores global parameters used to migrate data. For example, the global parameters may include a maximum and/or minimum amount of resources available for data migration (such as a maximum/minimum amount of network bandwidth or a maximum/minimum number of copiers 120, updaters 130, and/or managers 110).

In another example, global parameters may include any restriction on a data migration that is related to time. For example, a global parameter can restrict the migration process by limiting the amount of resources (such as bandwidth) used for the migration based on the time of day, day of the week/month/year, or any other indication or measurement of time. In other words, during certain hours, days, weeks, months, years, or any measurement of time, it may be desirable to limit the amount of bandwidth used to migrate data. Such a situation may arise in a system where there is considerable bandwidth demand during working hours. In such as situation, the amount of bandwidth available for data migration may be decreased during working hours and increased during non-working hours.

In another example, global parameters may include any restriction on a data migration that is related to current usage of a production system. A production system is any device or devices that produce the data that is to be migrated. In this example, a global parameter may restrict the amount of resources available for a data migration based on a determination of how busy the production system currently is. For example, if the production system is producing X sets of data per hour, one or more global parameters correlated to the rate of X sets of data per hour may be used to restrict the data migration.

In another example, global parameters may include any one or more of the constraints described above. In such an example, a global parameter is treated as a constraint on the data migration.

The meta data entity stores information on the data being migrated. For example, the meta data entity may store information on which medical imaging studies or groups of emails are being migrated and on which individual image files or emails are associated with those studies. This information is stored at knowledge base 140 and may be a meta data link to one or more of the data sets to be migrated by system 100.

After manager 110 consults knowledge base 140 to acquire one or more constraints on the data migration, one or more constraints are communicated between knowledge base 140 and manager 110. For example, in response to a request sent by manager 110 to knowledge base 140, knowledge base 140 may communicate one or more constraints or one or more global parameters (treated as constraints) to manager 110.

Based on the global parameters and/or constraints communicated between knowledge base 140 and manager 110, manager 110 allocates available resources for the data migration. A resource can include, for example, one or more copiers 120, one or more updaters 130, or an amount of network bandwidth. For example, based on a total amount of data to be migrated and a time limit for completing the data migration, manager 110 may determine that a particular number of copiers 120 is required to complete the migration. Similarly, based on these same (or different) constraints, manager 110 may determine that a particular number of updaters 130 is required to complete the migration, for example.

The allocation of migration resources may be based on any factor or combination of factors. For example, the allocation may be obtained from a lookup table stored at manager 110 and/or knowledge base 140. The allocation may also be based on one or more equations stored at manager 110 and/or knowledge base 140.

In another embodiment of the present invention, instead of allocating existing copiers 120 and/or existing updaters 130, manager 110 may spawn or create a particular number of copiers 120 and/or a particular number of updaters 130 for a data migration. Once again, the number of copiers 120 and/or updaters 130 spawned by manager 110 may be based on one or more constraints obtained from knowledge base 140.

In one embodiment of the present invention, when manager 110 allocates or spawns a copier 120, a particular data set or file set is assigned to the copier 120. The copier 120 ensures that the underlying copy scripts 125 have successfully moved the data from the starting storage location to the ending storage location. While manager 110 may associate or put a particular data set in state 320, copier 120 that is assigned to the data set updates the state of the data set to other states, such as state 330, 340 and/or 350, for example.

Once the resources are allocated, the data migration may begin. During the migration, copiers 120 are responsible for copying data from the starting storage location to the ending storage location. In addition, copiers 120 are responsible for communicating or notifying knowledge base 140 of one or more states of the data during the migration, as described above.

Copiers 120 may copy data from the starting storage location to the ending storage location by physically copying the data itself or by creating or spawning one or more copy scripts 125. The number of copy scripts 125 spawned by copiers 120 may be determined by manager 110 (and communicated to copiers 120), for example. In another embodiment, the number of copy scripts 125 spawned may be determined by copiers 120 based on one or more constraints of the data migration (communicated to copiers 120 by manager 110).

Copiers 120 and/or copy scripts 125 then begin the process of copying data from the starting storage location to the ending storage location. As the data may include various subsets of data, copiers 120 and/or copy scripts 125 each may copy individual bits of data, individual subsets of the data, or the entire set of data at a time.

Copiers 120 determine or monitor one or more states of state flow 300 and report these states to manager 110. In one embodiment of the present invention, copiers 120 monitor the following states of data: non-migrated state 310, migration-in-progress state 320, migration-error state 330, migration-not-required state 340, and repeat-migration state 380. In another embodiment of the present invention, copiers 120 monitor a greater or lesser number of states from state flow 300.

Updaters 130 update a meta data link in database 150 once data migration is complete, as described above. Updaters 130 also determine or monitor one or more states of state flow 300 and report these states to manager 110. In one embodiment of the present invention, updaters 130 monitor the following states of data: data-transferred-to-destination state 350, meta-data-update-in-progress state 360, and migration-complete state 370. In another embodiment of the present invention, updaters 130 determine or monitor a greater or lesser number of states from state flow 300.

In one embodiment of the present invention, when manager 110 allocates or spawns an updater 130, a particular data set or file set is assigned to the updater 130. The updater 130 that is assigned to the data set updates the state of the data set to other states, such as states 360 and/or 370, for example.

As the data migration proceeds, the data proceeds through one or more states of state flow 300. As the data proceeds through these states and copiers 120 and/or updaters 130 determine these states, copiers 120 and/or updaters notify manager 110 of the states. By doing so, manager 110 may be apprised of the status of a data migration at any point in time. As manager 110 may be aware of the data migration status throughout the migration, if migration is halted either intentionally or unintentionally, manager 110 may re-start the migration at the same point (or state) at which the migration was halted.

Based on the status of the data migration, manager 110 may re-allocate one or more resources during the migration. For example, based on one or more states communicated from copier(s) 120 and/or updater(s) 130, manager 110 may determine that a larger or smaller number of copiers 120 and/or updaters 130 are required. Manager 110 may determine that a data migration is proceeding too slowly or in an incorrect order based on one or more states monitored by copiers 120 and/or updaters 130. For example, manager 110 may be aware that a migration of several thousand data sets must be completed by a point in time defined by knowledge base 140. Based on this time limit, manager 110 initially allocated a particular number of copiers 120 and a particular number of updaters 130. During the data migration, copiers 120 and/or updaters 130 notify manager 110 of the various states that the data sets are in at given points in time. Based on these notifications, manager 110 may determine that the data migration is proceeding too slowly. Manager 110 may then reallocate migration resources by increasing the number of copiers 120 and/or updaters 130 involved in the data migration. This reallocation may occur during the data migration.

In various embodiments of the present invention, copiers 120 and/or updaters 130 may notify manager 110 of one or more states of data migration on a continuous, periodic and/or regular basis. For example, copiers 120 and/or updaters 130 may notify manager 110 of one or more states on a regular basis and/or each time the data being migrated changes states. In another embodiment, copiers 120 and/or updaters 130 may notify manager 110 of one or more states every time a user of system 100 prompts copiers 120 and/or updaters 130 to do so. In various embodiments of the present invention, copiers 120 and/or updaters 130 may notify manager 110 of one or more states of data migration on a continuous, periodic and/or regular basis. For example, copiers 120 and/or updaters 130 may notify manager 110 of one or more states on a regular basis and/or each time the data being migrated changes states. In another embodiment, copiers 120 and/or updaters 130 may notify manager 110 of one or more states every time a user of system 100 prompts copiers 120 and/or updaters 130 to do so.

In various embodiments of the present invention, manager 110 may determine whether a re-allocation of data migration resources is necessary on a continuous, periodic and/or regular basis. For example, manager 110 may determine whether a re-allocation is needed on a regular basis and/or each time the data being migrated changes states. In another embodiment, manager 110 may determine whether a re-allocation is needed every time a user of system 100 prompts manager 110 to do so. In various embodiments of the present invention, copiers 120 and/or updaters 130 may notify manager 110 of one or more states of data migration on a continuous, periodic and/or regular basis. For example, copiers 120 and/or updaters 130 may notify manager 110 of one or more states on a regular basis and/or each time the data being migrated changes states. In another embodiment, copiers 120 and/or updaters 130 may notify manager 110 of one or more states every time a user of system 100 prompts copiers 120 and/or updaters 130 to do so.

As manager 110 may be continuously, periodically, or regularly notified of the state(s) of a data migration and as manager 110 may continuously, periodically, and/or regularly communicate with knowledge base 140 to determine if any global parameters for the data migration have changed, manager 110 may continuously, periodically, and/or regularly re-evaluate the current allocation of data migration resources. If the current allocation does not or will not meet one or more global parameters and/or constraints of the data migration, manager 110 may then re-allocate data migration resources in an attempt to meet the global parameter(s) and/or constraint(s). Thus, an embodiment of the present invention provides for the dynamic allocation of resources in a state based migration of data.

In another embodiment of the present invention, manager 110 may calculate a migration rate. A migration rate is the rate at which the migration of data is proceeding. For example, if a total of X data bytes are being migrated over a time period of Y seconds, then the migration rate is X/Y. Based on this migration rate, manager 110 may re-allocate one or more migration resources, as described above.

In another embodiment of the present invention, manager 110 calculates a migration rate on a continuous, periodic, or regular basis.

In another embodiment of the present invention, one or more copiers 120 may communicate one or more states of a data migration to knowledge base 140. This communication may occur on a continuous, periodic, and/or regular basis. Based on this communication of states to knowledge base 140, knowledge base 140 may alter one or more of the global parameters and constraints stored at knowledge base 140.

In another embodiment of the present invention, manager 110 reports any one or more of a state of a data migration, a migration rate, and errors in data migration to feedback routine 160. Manager 110 may report this information to feedback 160 on a regular, continuous, or periodic basis, or when manually prompted by a user of system 100. Knowledge base 140 may then consult feedback 160 in order to obtain the information reported by manager 110. Knowledge base 160 may consult feedback 160 on a regular, periodic, or continuous basis, or whenever manually prompted by a user of system 100. Based on the information reported to feedback 160 by manager 110, knowledge base 160 may then alter one or more global parameters and/or constraints.

In another embodiment of the present invention, feedback routine 160 calculates a migration rate based on at least one state of data migration reported to feedback 160 by manager 110. Knowledge base 140 may then retrieve a migration rate from feedback routine 160 and alter one or more global parameters and/or constraints.

In another embodiment of the present invention, manager 110 periodically refers to knowledge base 140 to readjust resources based on the global parameters during migration. Feedback process 160 dynamically changes these global parameters based on conditions faced during migration. For example, feedback process 160 may reduce the number of copier 120 in the knowledge base 140 when it detects high computer or storage activity (e.g., high use of a production system). Manager 100 may then readjust itself to the new parameters the next time it refers to knowledge base 140.

In another embodiment of the present invention, a plurality of data migrations may occur using system 100 in a desired order. For example, in migrating several medical imaging studies from a legacy storage solution to a new storage solution, one or more users of system 100 may wish to migrate some imaging studies before other imaging studies. A user may assign an importance to some or all data that is to be migrated. Data having a higher importance level is migration prior to data having a lower importance level. In accordance with the above embodiments of system 100, the importance level assigned to a data set is treated as a constraint of data migration. Thus, manager 110 may allocate resources to migrate data in an order that migrates the data in a decreasing order of importance (for example, by migrating data with the highest importance level first and the data with the lowest importance level last).

In another embodiment of the present invention, two or more data migrations may occur from the same starting storage location to different ending storage locations. For example, two data migrations may begin at a common storage location and end at different storage locations.

In another embodiment of the present invention, two or more data migrations may occur from the different starting storage locations to the same ending storage location. For example, two data migrations may begin at different storage locations and end at a common storage locations In another embodiment of the present invention, a data migration may occur over three or more storage locations. For example, instead of migrating data from a first, or starting storage location to a second storage location, data is migrated from a first starting storage location to a second storage location to a third, final storage location.

Figure 2:
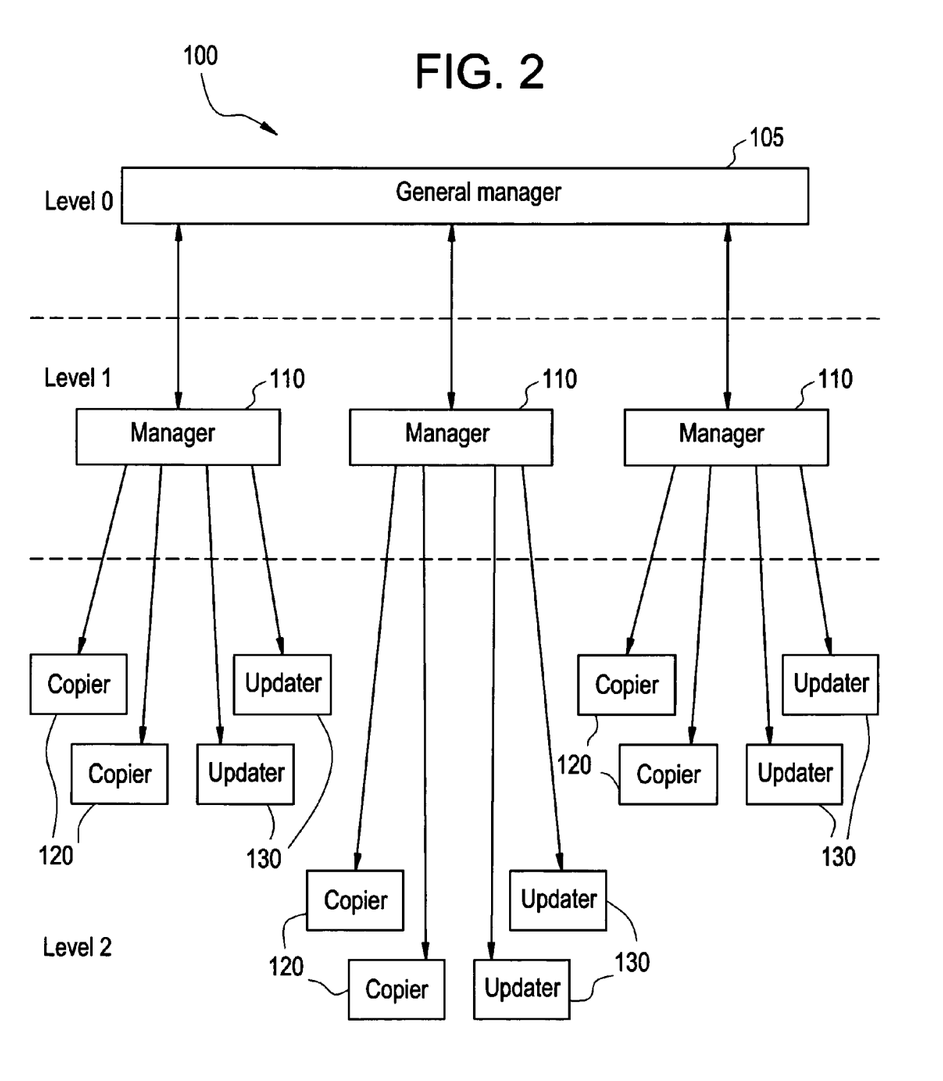
FIG. 2 illustrates the data migration system according to another embodiment of the invention.

FIG. 2 illustrates system 100 according to another embodiment of the invention. In this embodiment, system 100 may also include a general manager 105. In accordance with the comparison to a corporate structure, general manager 105 acts as a Chief Executive Officer ("CEO"), a Chief Technical Officer ("CTO"), or Chief Financial Officer ("CFO"), or Level 0 executive, for example. General manager 105 may be embodied in a set of instructions on a computer-readable storage medium. For example, general manager 105 may be embodied in a software application.

As described above, one or more managers 110 may exist in system 100. A general manager 105 may then assign one or more managers 110 to specific data migration tasks. For example, a general manager 105 may be associated with a particular hospital. This hospital wishes to migrate their medical imaging studies from a legacy tape storage solution to a newer disk storage solution. The hospital possesses a large number of medical imaging studies and therefore a considerable amount of data to be migrated. Therefore, general manager 105 may allocate one or more managers 110 to then each allocate one or more copiers 120 and/or updaters 130 to migrate the imaging studies as described herein, for example.

In an embodiment, each manager 110 of FIG. 2 only communicates with a feedback 160 and/or knowledge base 140 (not shown in FIG. 2) associated with that manager 110. In other words, each manager 110 has a specific feedback 160 and/or knowledge base 140 with which to communicate in accordance with the various embodiments of the present invention described herein.

In another embodiment, each manager 110 of FIG. 2 communicates with a common feedback 160 and/or knowledge base 140 (not shown in FIG. 2) associated with general manager 105. In other words, each manager 110 communicates with the same feedback 160 and/or knowledge base 140 in accordance with the various embodiments of the present invention described herein.

In an embodiment, each updater 130 of FIG. 2 only communicates with a database 150 (not shown in FIG. 2) associated with the same manager 110 that spawned or allocated the updater 130. In other words, each manager 110 may spawn or allocate one or more updaters 130 to update a link in a database 150, as described above, for example. This manager 110 may be associated with a database 150 separate from the database(s) 150 associated with other managers 110. The updaters 130 spawned or allocated by manager 110 may then update links in the database 150 associated with the manager 110 that spawned or allocated the updaters 130, and do not update links in any other database 150 associated with any other manager 110.

In another embodiment, each updater 130 of FIG. 2 communicates with one or more databases 150 (not shown in FIG. 2) common to one or more managers 110. In other words, two or more managers 110 may be associated with a common database 150 (for example, two or more managers 110 may allocate or spawn one or more updaters 130 to update one or more links in the common database 150). The updaters 130 spawned or allocated by these managers 110 may then update links in the database 150 common to these managers 110, and do not update links in any other database 150 associated with any other manager(s) 110.

Figure 4:
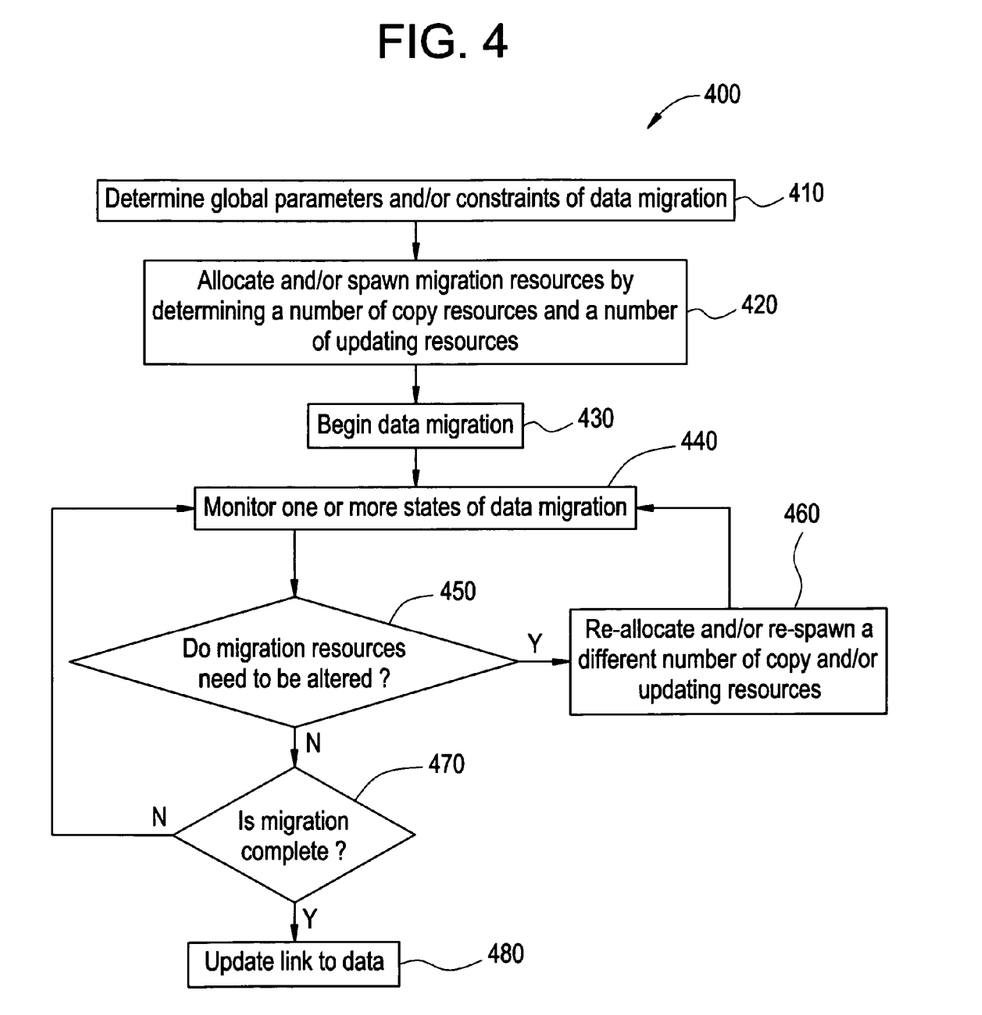
FIG. 4 illustrates a flowchart of a method for hierarchical state based migration of data in accordance with an embodiment of the present invention.

FIG. 4 illustrates a flowchart 400 of a method for hierarchical state based migration of data in accordance with an embodiment of the present invention. First, at step 410, one or more global parameters and/or constraints of a data migration are determined, as described above.

Next, at step 420, based on the global parameter(s) and/or constraint(s) determined at step 410, one or more migration resources are allocated and/or spawned in order to migrate the data from a first storage location to a second storage location. The migration resources may be allocated by determining a number of existing copy resources (for example, copiers 120 as described above) and/or a number of update resources (for example, updaters 130 as described above) to be involved in the migration of data. The migration resources may be spawned by determining a number of copy resources (for example, copiers 120 as described above) to be created and/or a number of update resources (for example, updaters 130 as described above) to be created and then spawning the number of copy resources and/or the number of update resources to be involved in the migration of data The allocation and/or spawning of migration resources may be based on any factor or combination of factors. For example, the allocation and/or spawning may be based on a lookup table. In such an example, a lookup table may be consulted in order to determine one or more of a number of copy resources and/or a number of update resources that correlate to one or more global parameters and/or constraints. In another example, the allocation and/or spawning may be based on the current conditions of a production system, as described above. For example, in situations where the production system is being heavily used (thereby resulting in a heavy load on computer memory and/or storage), the amount of migration resources being allocated and/or spawned may be decreased or downgraded.

Next, at step 430, the migration of data commences. As described above, one or more copy resources and/or update resources copy data from a first storage location to a second storage location and/or update a link (such as a meta data or hyperlink, for example) to the data in a database.

At step 440, one or more states of the data in the data migration are monitored during the data migration. For example, as described above, one or more of copy resources and update resources monitor one or more of the following states: a study-not-migrated or non-migrated state, a migration-in-progress state, a migration-error state, a migration-not-required state, a data-transferred-to-destination state, a meta-data-update-in-progress state, a migration-complete state, and a rollback or repeat-migration state.

At step 450, a determination is made as to whether one or more of the migration resources currently allocated for the migration of data need to be altered during the data migration. For example, based on one or more of a state of the data migration, a global parameter, and/or a migration constraint, at step 450 it may be determined that the number of copy and/or update resources need to be re-allocated. For example, if at step 450 it is determined that the migration is proceeding too slowly, too rapidly, or with too many errors, then the migration resources may need to be reallocated, as described above.

If at step 450 it is determined that the migration resources need to be reallocated, then method 400 proceeds to step 460. At step 460, a reallocation and/or re-spawning of migration resources occurs. As described above, this reallocation and/or re-spawning alters the number of copy resources and/or update resources involved in a data migration. The reallocation and/or re-spawning may be based on any number of factors, such as a lookup table or equation, as described above. In another example, the reallocation and/or re-spawning may be based on the current conditions of a production system, as described above. For example, in situations where the production system is being heavily used (thereby resulting in a heavy load on computer memory and/or storage), the amount of migration resources being allocated and/or spawned may be decreased or downgraded.

After step 460, method 400 proceeds to step 440, where the migration continues and one or more states of the migration are monitored. By proceeding in a loop from step 440, to step 450, to step 460 and back to step 440, method 400 introduces a method for migrating data where migration resources are dynamically updated and/or reallocated based on one or more global parameters, constraints, and/or states of the data migration.

If at step 450 it is determined that the migration resources do not need to be reallocated, then method 400 proceeds to step 470. At step 470, a determination is made as to whether the migration is complete. If the migration is not complete, method 400 proceeds to step 440, where one or more states of the migration is monitored.

In another embodiment, at step 470 a determination is made as to whether the migration is complete and error-free. For example, at step 470 it is determined if the copy of the data at the second or ending storage location is a complete, error-free copy of the data at the first or starting storage location. If the copy at the second storage location is complete and error free, then method 400 proceeds to step 480. Otherwise, method 400 proceeds to step 440.

If at step 470 it is determined that the migration is complete, then method 400 proceeds to step 480. At step 480, a link (such as a meta data or hyperlink) to the migrated data is updated by changing the storage location that the link points to. The storage location is changed from the first, or starting storage location (in other words, the pre-migration storage location) to the second, or ending storage location (in other words, the post-migration storage location).

In another embodiment, after the link has been updated in step 480, the original copy of the migrated data residing at the starting storage location is deleted.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features that come within the spirit and scope of the invention.

What is claimed is:

1. A computer-readable storage medium including a set of instructions for a computer, said instructions including:
   a knowledge base routine configured to store one or more constraints for a data migration of data from a first storage location to a second storage location, said knowledge base storing state information regarding said migration of data, wherein said at least one or more constraints includes a time limit for the migration of data, and wherein the state information includes a rate at which the migration of data is proceeding;
   one or more copy routines configured to copy said data from said first storage location to said second storage location;
   one or more update routines configured to update a storage location associated with said data in a database with said second storage location; and a managing routine configured to allocate a number of said copy routines and/or a number of said update routines to participate in said data migration, wherein said managing routine is configured to reallocate at least one of said number of copy routines and/or said update routines based on the rate at which the migration of data is proceeding and the time limit for the migration of data.

2. The set of instructions of claim 1, wherein said managing routine is configured to reallocate at least one of said number of copy routines and/or said update routines based on one or more states of said data in said data migration and/or one or more of said constraints, and wherein said states of said data includes one or more of a non-migrated state, a migration-in-progress state, a migration-error state, a migration-not-required state, a data-transferred-to-destination state, a meta-data-update-in-progress state, a migration-complete state, and a repeat-migration state.

3. The set of instructions of claim 2, wherein one or more of said copy routines is configured to monitor at least one of said non-migrated state, said migration-in-progress state, said migration-error state, said migration-not-required state, and said repeat-migration state.

4. The set of instructions of claim 2, wherein one or more of said update routines is configured to monitor at least one of said data-transferred-to-destination state, said meta-data-update-in-progress state, and said migration-complete state.

5. The set of instructions of claim 1, wherein said constraints include one or more of an identity of one or more sets of data to be included in said data migration, a number of sets of data to be included in said data migration, a total amount of said data to be included in said data migration, a total amount of available storage at said second storage location, and a starting time for said data migration.

6. The set of instructions of claim 1, wherein said knowledge base routine is configured to alter one or more of said constraints during said data migration.

7. The set of instructions of claim 1, wherein said managing routine is configured to alter at least one of said number of copy routines and said number of said update routines based on a feedback loop with said knowledge base routine, said feedback loop configured to provide one or more of said constraints to said managing routine from said knowledge base routine and to provide one or more of said states to said knowledge base from said managing routine.

8. The set of instructions of claim 7, wherein said managing routine is configured to consult with said knowledge base via said feedback loop on a periodic basis during said data migration in order to alter at least one of said number of copy routines and said number of said update routines.

9. The set of instructions of claim 1, wherein said database includes at least one metadata link to said data and one or more of said update routines is configured to update said storage location associated with said data in said database by updating said at least one metadata link with said second storage location.

10. The set of instructions of claim 1, wherein said first storage location is remote from said second storage location.

11. A method for hierarchical state based migration of data, said method including:
    determining one or more constraints for a migration of data from a first storage location to a second storage location, wherein said one or more constraints includes a time limit for the migration of data;
    based on said one or more constraints, allocating a number of copy resources to copy said data from said first storage location to said second storage location;
    based on said one or more constraints, allocating a number of updating resources to update a storage location associated with said data in a database with said second storage location;
    determining a rate at which the migration of data is proceeding;
    reallocating at least one of said number of copy resources and said number of updating resources during said migration of data based on the rate at which the migration of data is proceeding and the time limit for the migration of data.

12. The method of claim 11, further including altering at least one of said constraints based on one or more states of said data in said data migration, wherein said states include one or more of a non-migrated state, a migration-in-progress state, a migration-error state, a migration-not-required state, a data-transferred-to-destination state, a meta-data-update-in-progress state, a migration-complete state, and a repeat-migration state.

13. The method of claim 11, wherein said one or more constraints include at least one of an identity of one or more data sets to be included in said migration, a number of data sets to be included in said migration, a total amount of said data to be included in said migration, a total amount of available storage at said second storage location, and a starting time for said migration.

14. A method for migrating data, said method including:
    allocating one or more migration resources based on one or more constraints of a data migration, wherein said constraints includes a time limit for the migration of data;
    determining one or more states of said data migration, wherein said one or more states includes a rate at which the migration of data is proceeding; and
    based on said time limit and said rate, reallocating at least one of said migration resources.

15. The method of claim 14, wherein said determining step occurs during said data migration.

16. The method of claim 14, wherein said reallocating step occurs during said data migration.

17. The method of claim 16, further including altering one or more of said constraints during said data migration.

18. The method of claim 14, wherein said migration resources include at least one data copying routine and/or at least one link updating routine, said data copying routine configured to copy said data from a starting storage location to an ending storage location in said data migration, said link updating routine configured to update a meta data link to said data with said ending storage location.

19. The method of claim 14, wherein said states include one or more of a non-migrated state, a migration-in-progress state, a migration-error state, a migration-not-required state, a data-transferred-to-destination state, a meta-data-update-in-progress state, a migration-complete state, and a repeat-migration state.

20. The method of claim 14, further including allocating one or more migration resources based on one or more global parameters, wherein said global parameters include at least one of a maximum and minimum amount of said migration resources available for said data migration.

21. The method of claim 14, wherein said constraints include at least one of an identification of said data, a number of data sets to be migrated, a total amount of data to be migrated, an amount of storage that is available at said second storage location, and a plurality of time limits.

* * * * *